United States Patent [19]

St. John

[11] 4,402,678
[45] Sep. 6, 1983

[54] CLUTCH HOUSING AND PULLEY ASSEMBLY

[75] Inventor: Richard C. St. John, North Canton, Ohio

[73] Assignee: Dyneer Corporation, Canton, Ohio

[21] Appl. No.: 195,012

[22] Filed: Oct. 8, 1980

Related U.S. Application Data

[62] Division of Ser. No. 957,706, Nov. 6, 1978, Pat. No. 4,254,541.

[51] Int. Cl.$^3$ .......................... F16H 55/36; F16H 7/20
[52] U.S. Cl. ..................................... 474/171; 474/199
[58] Field of Search .................. 192/105 CE, 105 CD, 192/105 BA; 474/13, 14, 150, 158, 901, 902, 168, 171, 152–153, 180, 181, 165, 198–199; 29/509, 525

[56] References Cited

U.S. PATENT DOCUMENTS

| | | | |
|---|---|---|---|
| 1,995,907 | 3/1935 | Stoll | 474/180 |
| 2,427,172 | 9/1947 | Williams | 474/180 |
| 2,594,810 | 4/1952 | Schaub et al. | 29/525 |
| 2,652,816 | 9/1953 | Dodge | 192/105 CE |
| 2,665,790 | 1/1954 | Birbaum | 192/105 B |
| 2,762,483 | 9/1956 | Clark | 192/105 BA |
| 2,910,891 | 11/1959 | Heckethorn | 474/171 |
| 3,197,004 | 7/1965 | Salsbury | 192/105 CD |
| 3,245,273 | 4/1966 | Loper et al. | 474/168 |
| 4,016,642 | 4/1977 | Kraft et al. | 29/509 |
| 4,016,963 | 4/1977 | St. John | 192/105 BA |
| 4,182,193 | 1/1980 | Schultz, Jr. | 474/902 |
| 4,226,134 | 10/1980 | Sohnle | 474/181 |

*Primary Examiner*—Lawrence J. Staab
*Assistant Examiner*—Andrew Joseph Rudy
*Attorney, Agent, or Firm*—Frease & Bishop

[57] ABSTRACT

A clutch housing and pulley assembly is formed from a plurality of stamped metal components. A plurality of annular discs are mounted on a radially extending base of a V-grooved pulley member. A cup-shaped clutch housing having a radially extending base is mounted in abutting relationship with one of the outer discs on one side of the pulley base. A plurality of rivets extend through axially aligned holes formed in the pulley base, discs and housing base to assemble these components into a single unit. A ring bearing is telescopically mounted in the axially aligned central openings of the discs and pulley base for rotatably mounting the clutch housing and pulley assembly on a drive shaft which is adapted to extend through a central opening of the clutch housing base.

The pulley member and discs are arranged in a stacked relationship on a plurality of guide pins extending through the rivet-receiving holes. A metal sizing punch or broach having the bearing ring mounted thereon then is passed through the aligned central openings of the discs and pulley base to accurately size the central openings in a single stroke. The bearing ring is press fitted in the sized central openings of the discs and pulley base generally simultaneously with the sizing stroke. The cup-shaped housing then is mounted on the disc reinforced pulley and bearing subassembly by rivets which clamp the assembled components together for subsequent mounting on a drive shaft which telescopically extends through the inner race of the bearing ring.

1 Claim, 16 Drawing Figures

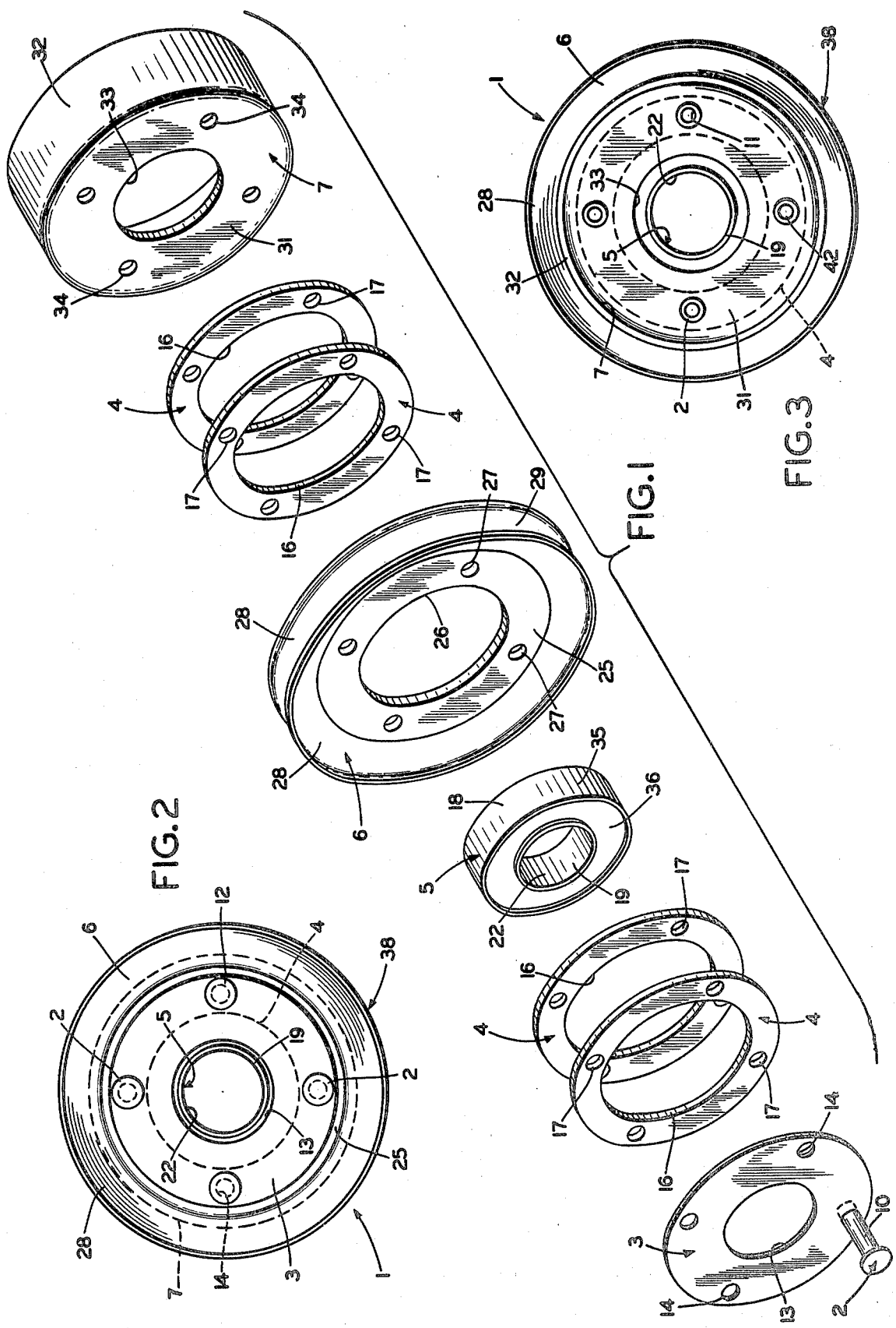

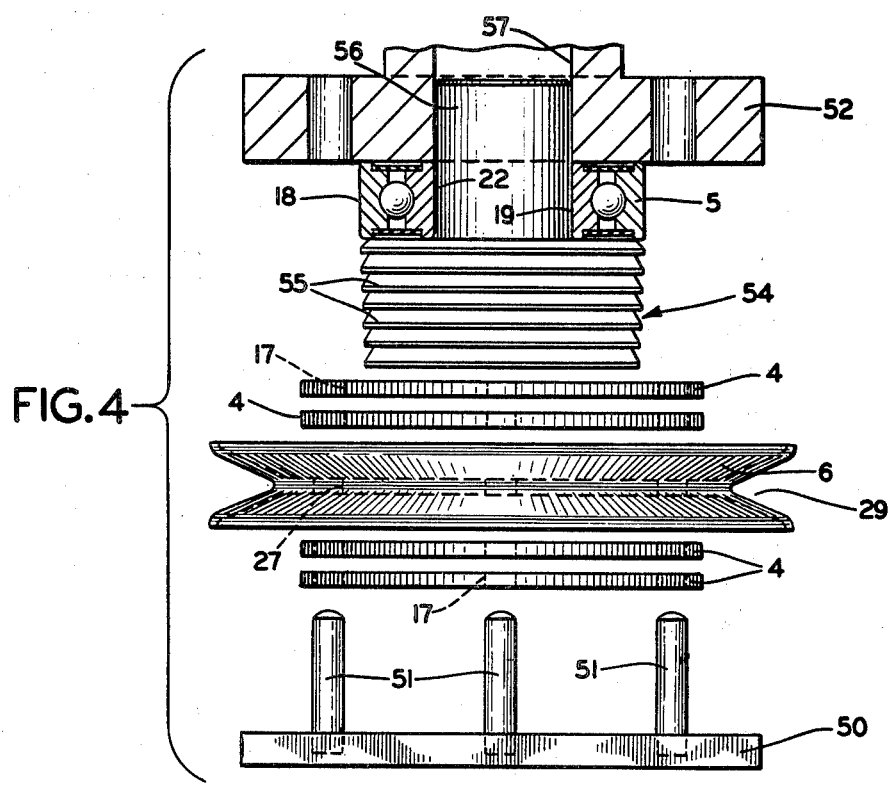
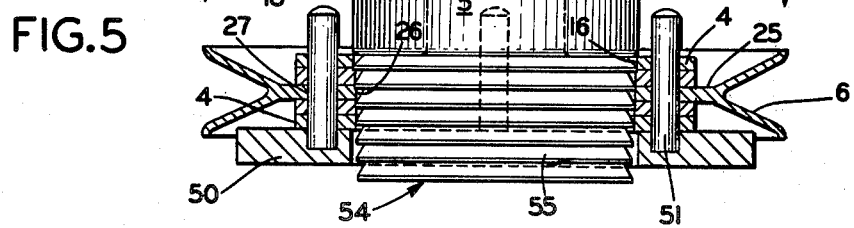
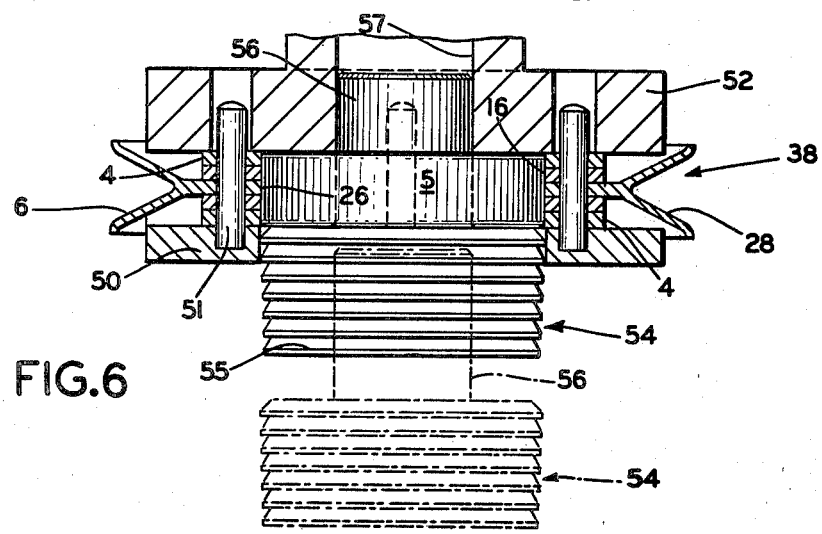

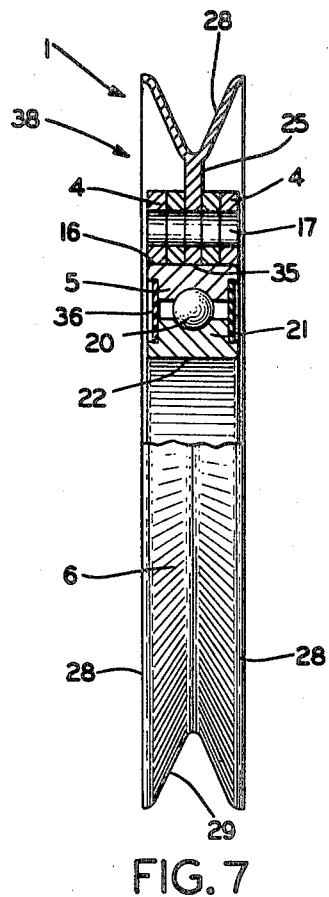
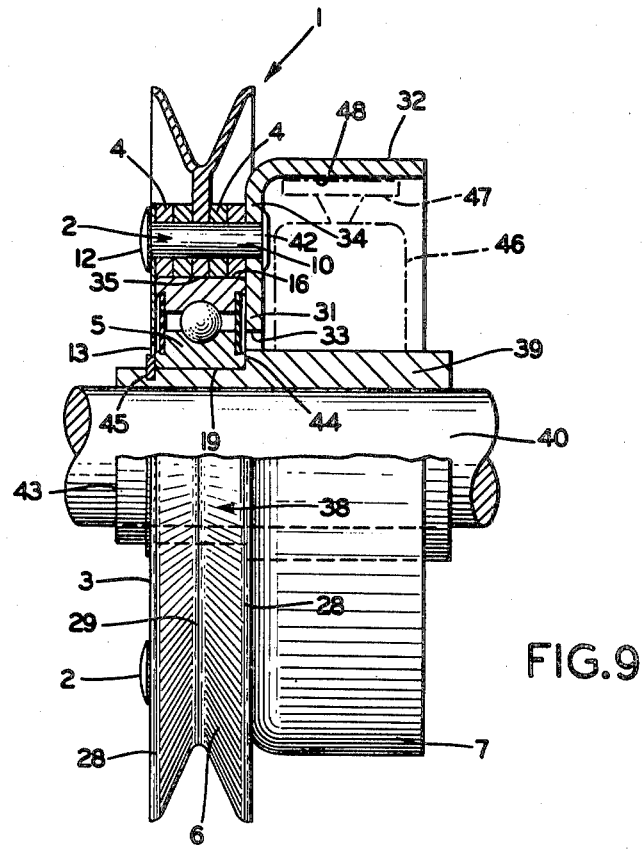
FIG. 7
FIG. 9
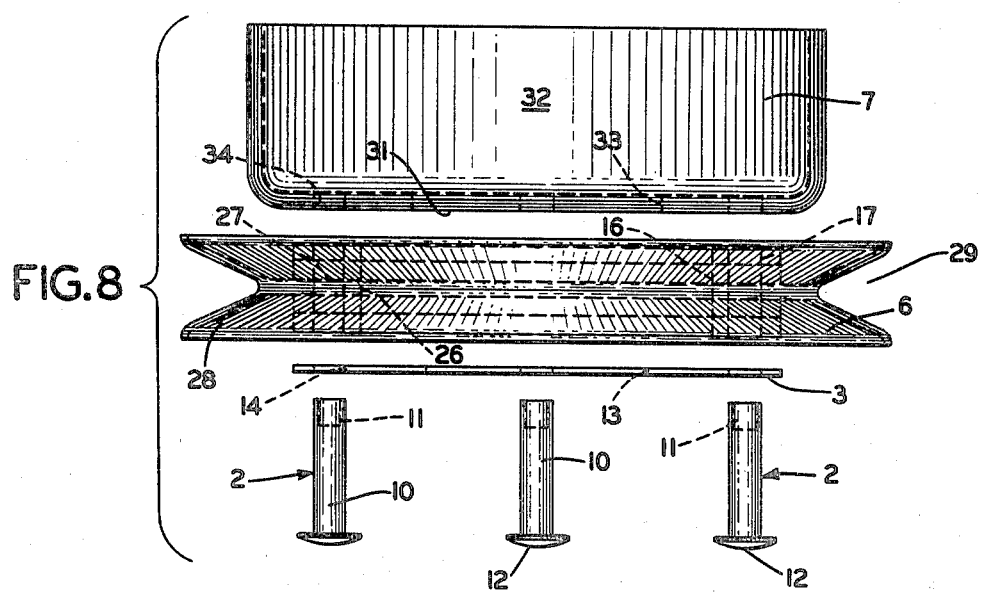
FIG. 8

CLUTCH HOUSING AND PULLEY ASSEMBLY

CROSS-REFERENCE TO RELATED APPLICATION

This application is a division of my copending application Ser. No. 957,706, filed Nov. 6, 1978, now U.S. Pat. No. 4,254,541.

BACKGROUND OF THE INVENTION

1. Field of the Invention

The invention relates primarily to pulleys and clutches and particularly to clutches having a pulley and a clutch housing assembly for use with a clutch rotor, although not wholly limited to such types of constructions. More particularly, the invention relates to a clutch housing and pulley assembly formed of stamped sheet metal components. Also, the invention relates to an improved method of installing a bearing in the pulley when forming the improved clutch housing and pulley assembly.

2. Description of the Prior Art

There are varieties of individual clutch and pulley constructions and combinations thereof of the type in which a clutch rotor is mounted on a drive shaft for drivingly engaging a clutch housing. The clutch housing is mounted on or is formed as an integral part of a pulley or similar driven member which is rotatably coupled with the clutch rotor upon the drive shaft reaching a predetermined speed. The clutch housing and pulley assembly is rotatably mounted on the drive shaft by bearings permitting the drive shaft to rotate freely with respect to the assembly without rotating the assembly until coupling engagement is achieved by the rotating clutch rotor.

There are numerous configurations and arrangements of the driven clutch housing and associated pulley assembly depending upon the particular application in which the clutch is intended for use. These assemblies are constructed in various sizes and of different materials. Many of these assemblies consist of a one-piece cast metal pulley and housing member, such as shown in Pat. No. 2,552,747. These cast metal members are susceptible to breakage due to flaws which may occur in the member during casting, and generally are heavier than similar size sheet metal members and to not provide good heat dissipation. Other constructions consist of a clutch housing and pulley assembly formed by stamping or metal spinning procedures, or combinations thereof. These stamped and spun pulleys are satisfactory for many applications but may require special reinforcements and modifications when used in clutch assemblies where relatively large torques and forces may be exerted on the pulley and clutch housing. These reinforcing components and modifications increase both the material and manufacturing costs of the clutch housing and pulley assembly.

It is more economical when manufacturing large quantities of most products such as clutches, to be able to use the same type and size of metal for as many of the components as possible. This enables greater quantites of the material to be purchased, usually at a reduced cost, resulting in fewer types of metal stock, thereby reducing inventory and storage requirements.

Another problem that is encountered with prior clutch constructions in which the pulley and clutch housing are formed as an integral member, whether formed of cast metal or sheet metal, is the need for an assembly of a completely different size and configuration for each particular clutch application. Each clutch application may require a different pulley diameter, number of peripheral belt receiving grooves, metal thickness, etc., as well as different thicknesses, diameters and configurations of clutch housings. This requires different manufacturing procedures and equipment to produce these various pulley and clutch housing assemblies, resulting in increased costs for the over-all clutch construction.

Still another problem that is encountered with prior pulley and clutch constructions is in the manufacturing procedures that are used in making the clutch housing and associated pulleys. In many of the stamped sheet metal type assemblies, the various components must be accurately sized and formed, especially certain openings, notches, etc., which are adapted to receive another component therein when forming the assembly. Any manufacturing procedure which requires extremely accurate sizing and dimensioning is usually more time consuming and expensive and requires more elaborate equipment than those procedures in which the tolerances are not as critical. This is especially true in stamping sheet metal components used in the clutch and pulley art in which a bearing is to be forced fitted into an opening formed in the pulley or housing to avoid the cost for welding, riveting, brazing or other means for securing the bearing in the opening.

Therefore, the need has existed for an improved clutch housing and pulley assembly and a method of making the same in which the assembly can be modified easily and inexpensively to meet the performance and operating requirements for various clutch applications, in which the assembly can be formed of sheet metal components, preferably from the same sheet metal stock, in which the assembly can be manufactured in an efficient and inexpensive manner, and in which a bearing can be installed easily and conveniently in a pulley or similar component.

SUMMARY OF THE INVENTION

Objectives of the invention include providing a clutch housing and pulley assembly formed of stamped sheet metal components, preferably of the same metal stock to reduce material, storage and inventory costs, which when assembled provides an extremely rugged, durable and relatively lightweight assembly; providing such an assembly in which a plurality of discs may be mounted on the base of a pulley member, with the clutch housing being mounted thereon by a plurality of rivets to enable the assembly to meet various design criteria; providing such an assembly in which the rivets may have a rectangular-shaped cross-sectional configuration which extend through complementary-shaped, axially aligned notches formed in the discs, pulley base and clutch housing hub to enable smaller size pulleys to be produced without sacrificing strength and reliability; providing such an assembly which provides versatility in the manufacture of such assemblies by enabling various combinations of clutch houses and pulley sizes and configurations to be produced with a minimum number of components and without greatly affecting the method of manufacture; providing such an assembly which will eliminate welding and brazing operations, and will eliminate expensive and time-consuming machining and metal casting procedures heretofore used for manufacturing prior art clutch assemblies; and providing such an assembly which eliminates difficulties encountered with prior clutch constructions and achieves advantages not believed present with known clutch assemblies.

Furthermore, these objectives and advantages are obtained by an improved method of making a clutch housing and pulley assembly in which most of the assembly components are stamped from the same gauge sheet metal stock in inexpensive stamping procedures without strict adherence to certain critical tolerances, and in which these components can be produced at one or more sites remote from the final assembly site, enabling different sources of supply to be obtained; providing such a method in which a pulley is sandwiched between a plurality of discs, the number of such discs depending upon the particular clutch housing and pulley configuration being used, in which a hole sizing tool is passed through the aligned roughly sized central openings of the stacked discs and pulley member to accurately size the openings for receiving a bearing ring therein and forming a press fit engagement therewith, and in which the bearing ring is preloaded on the sizing tool and is press fitted into position within the central openings of the discs and pulley in the same stroke of a press during which the openings are sized by the tool to form a laminated pulley subassembly; providing such a method in which the formed pulley subassembly then is mounted on a clutch housing, preferably by a plurality of rivets which extend through aligned holes formed in the pulley base, discs and clutch housing hub for securely mounting the clutch housing on the subassembly, and in which an end plate may be mounted by the same rivets on the opposite side of the subassembly from that of the clutch housing; providing such a method which enables a bearing to be installed in a pulley or similar annular-shaped object in an extremely simple and inexpensive manner; and providing such a method which is intended to reduce manufacturing costs while producing the improved clutch housing and pulley assembly described above.

These objectives and advantages are obtained by the clutch housing and pulley assembly of the invention, the general nature of which may be stated as including a pulley member having a radially extending base terminating in a peripheral V-groove; a central opening formed in the base of the pulley member; bearing means mounted in the base opening and adapted to receive a drive shaft therein; a plurality of annular-shaped discs, each being formed with a central opening mounted concentrically on the pulley member base, with the disc openings being axially aligned with the pulley member base opening; clutch housing means having a radially extending base and an axially extending cylindrical-shaped side wall; pin means mounting the discs and the clutch housing means on the pulley member base with the housing means base being in abutting relationship with at least one of the discs; and central opening means formed in the clutch housing means base and axially aligned with the disc openings and the pulley member base opening for receiving a drive shaft therethrough.

These objectives and advantages are further obtained by the improved method of making a laminated clutch housing and pulley assembly, the general nature of which may be stated as including the steps of stacking a pulley member and a plurality of discs, with said pulley member being sandwiched between at least a pair of said discs, and with central openings formed in the pulley member and discs being in axial alignment; sizing the aligned central openings of the pulley member and discs by passing a sizing tool through said openings; press fitting bearing means in the sized central openings of the pulley member and discs; and mounting a clutch housing on the pulley member, disc and bearing means assembly.

BRIEF DESCRIPTION OF THE DRAWINGS

Preferred embodiments of the invention—illustrative of the best modes in which applicant has contemplated applying the principles—are set forth in the following description and shown in the accompanying drawings, and are particularly and distinctly pointed out and set forth in the appended claims.

FIG. 1 is an exploded perspective view of most of the components which form the improved clutch housing and pulley assembly;

FIG. 2 is a left-hand end elevational view of the assembled components of FIG. 1;

FIG. 3 is a right-hand end elevational view of the assembly components of FIG. 1;

FIG. 4 is a diagrammatic exploded view, portions of which are in section, showing the stacking arrangement of the discs and pulley member in combination with a bearing loaded, hole sizing tool;

FIG. 5 is a diagrammatic view, portions of which are in section, showing the position of the components and sizing tool of FIG. 4 during the sizing step of the improved method;

FIG. 6 is a diagrammatic view, portions of which are in section, showing the position of the components and sizing tool of FIGS. 4 and 5 during the step of press fitting the bearing in the sized openings formed in the step of FIG. 5, and with the sizing tool being shown in dot-dash lines removed from the press;

FIG. 7 is an enlarged side elevational view, with portions broken away and in section, of the pulley subassembly formed by the method steps of FIGS. 4, 5 and 6;

FIG. 8 is an exploded plan view showing the pulley subassembly of FIG. 7 position for assembly with a clutch housing and an end plate by a plurality of rivets;

FIG. 9 is a side elevational view, with portions broken away and in section, showing the clutch housing and pulley assembly of FIG. 8 rotatably mounted on a hub and drive shaft with a clutch rotor being shown in dot-dash lines within the clutch housing;

Similar numerals refer to similar parts throughout the drawings.

DESCRIPTION OF THE PREFERRED EMBODIMENTS

First Embodiment

Figure 10:
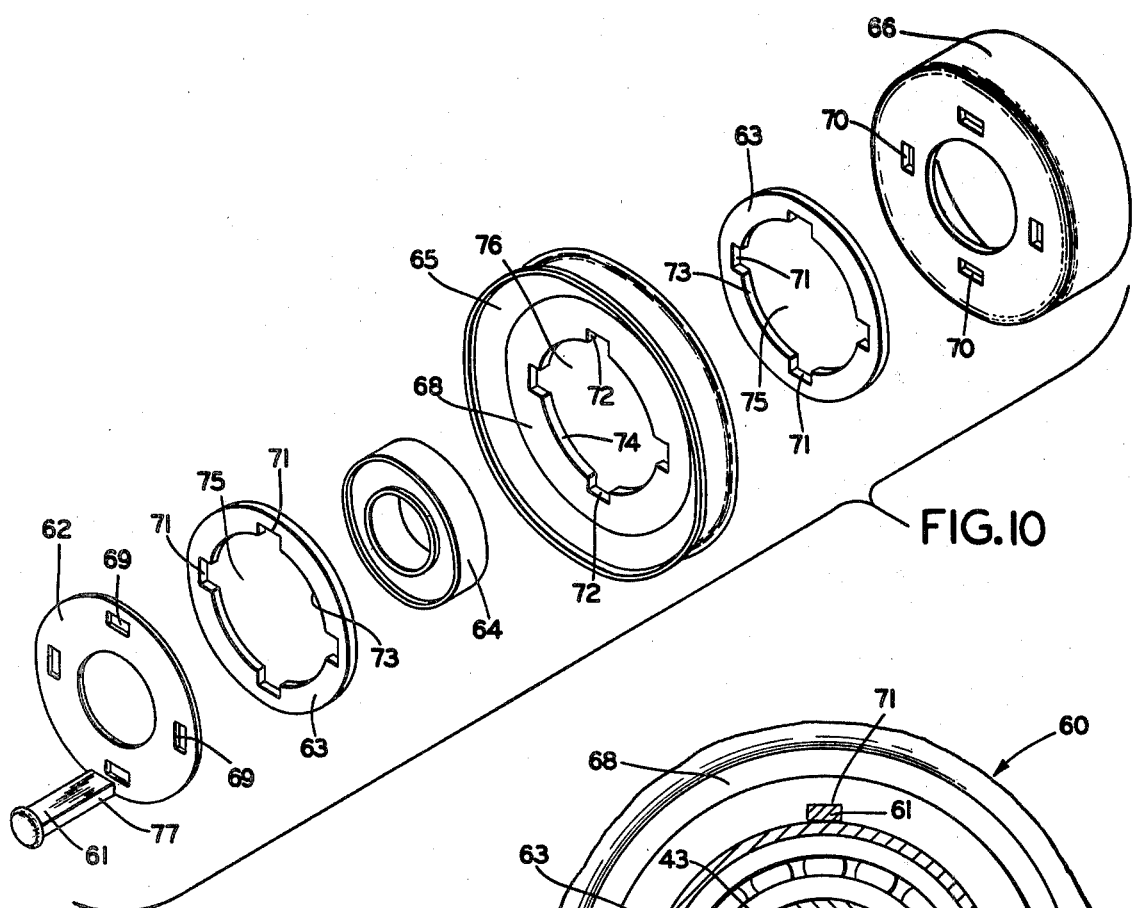
FIG. 10 is a fragmentary, exploded perspective view similar to FIG. 1, showing a modified form of the improved clutch housing and pulley assembly.

The improved clutch housing and pulley assembly is indicated generally at 1 and is shown particularly in FIGS. 1-3 and 7-9. The main components of assembly 1 are shown in an exploded condition in FIG. 1 and include a plurality of rivets 2 (only one of which is shown), an end plate 3, a plurality of spacer discs 4, a bearing ring 5, a pulley member 6, and a clutch housing 7.

Rivets 2 (FIG. 8) have a usual cylindrical-shaped shank 10 with a hollow end 11 opposite of a head 12. End plate 3 has a flat, annular, disc-shaped configuration formed with a central opening 13 and a plurality of holes 14 spaced equally circumferentially about the disc surface. Discs 4 (four of which are shown in the embodiment illustrated) each have a flat, annular configuration formed with a central opening 16 and a plurality of equally circumferentially spaced holes 17.

Bearing 5 is a usual ring-type bearing having spaced, concentrically mounted, outer and inner races 18 and 19 (FIGS. 7 and 9) with a plurality of ball bearings 20 mounted within a bearing cage 21 located between races 18 and 19. Inner race 19 forms a central opening or shaft-receiving bore 22.

Pulley member 6 has a radially extending annular-shaped base 25 formed with a central opening 26 and a plurality of equally circumferentially spaced holes 27. Base 25 terminates in a pair of outwardly extending flanges 28 which form a belt-receiving V-groove 29 therebetween.

Clutch housing 7 preferably has a cup-shaped configuration formed by an annular-shaped, radially extending hub wall 30 which terminates in an axially extending cylindrical side wall 32. A central opening 33 is formed in hub wall 31, together with a plurality of equally circumferentially spaced holes 34.

In accordance with one of the features of the invention, discs 4, pulley 6 and clutch housing 7 may be formed from the same gauge thickness and type of sheet metal. Thie enables relatively large quantites of the sheet metal to be purchased, sometimes at a better price than when purchased in smaller quantities, and reduces the amount of inventory, storage and handling that would be required if three different types and thicknesses of sheet metal were required.

Discs 4 can be produced relatively inexpensively by any one of various known stamping operations, during which central opening 16 and holes 17 are formed therein. Pulley 6 also may be stamped initially as a flat disc from the same sheet metal stock, with central opening 26 and holes 27 being formed therein during the stamping operation. The peripheral edge of the stamped pulley disc then may be slit and subsequently worked to form the pair of flange 28 and V-groove 29 in a known slitting and metal-working operation, such as shown in U.S. Pat. Nos. 1,555,771, 3,225,425 and 4,041,746. Pulley 6 also may have other peripheral edge configurations such as poly-V-groove, timing belt, flat belt, etc.

Clutch housing 7 also may be formed by a series of metal-stamping and forming operations during which central opening 33 and holes 34 are formed in hub wall 31.

Each of these components can be formed at separate sites or manufacturing plants, if desired, and shipped to a final assembly site, enabling different sources to be obtained for each of the components to provide reliability and ensure delivery of the needed components. Pulley 6 and clutch housing 7 can be formed by various metal spinning operations instead of metal stamping, drawing or forming operations.

End plate 3 preferably is formed of a thinner gauge metal than discs 4, since plate 3 primarily provides mechanical protection for the bearing seals 36, as shown in FIGS. 7 and 9, and is not used for strengthening, reinforcing or spacing purposes. End plate 3 also is effective in retaining grease which is purged beyond the bearing seal within the space between the seal and end plate.

Bearing 5 may have various configurations than that shown in the drawings without departing from the concept of the invention. The particular bearing shown provides satisfactory results, with the broad cylindrical surface 35 of outer race 18 providing sufficient surface area for a force fit engagement within the central openings of discs 4 and pulley 6 when mounted therein as described below. Clutch housing 7 likewise may have various configurations than the cup shape shown in the drawings and described above, depending upon the particular clutch rotor with which it is intended to be used. For example, the diameter of clutch housing side wall 32 may be greater than the diameter of pulley 6 and may be connected to hub wall 31 by a tapered conical section, etc. without departing from the concept of the invention.

FIG. 7 illustrates a reinforced, bearing-mounted pulley subassembly 38, which is formed during the construction of assembly 1 by the improved method set forth in detail below. Subassembly 38 is shown in FIG. 9 mounted on clutch housing 7 to form the completed clutch housing and pulley assembly 1. Assembly 1, in turn, is shown in FIG. 9 mounted on a cylindrical hub 39, which is mounted for rotation on a drive shaft 40.

Subassembly 38 includes a plurality of discs 4 which are mounted in juxtaposition with pulley 6 in abutting relationship with pulley base 25, with bearing 5 being mounted with aligned central openings 16 and 26 of discs 4 and pulley 6. Outer surface 35 of race 18 has a force-fit engagement with the circular edges which form central openings 16 and 26 in discs 4 and pulley 6. Subassembly 38 is mounted on clutch housing 7 together with end plate 3 by a plurality of rivets 2 (four of which are illustrated in the drawings) which extend through aligned holes 14, 17, 27 and 34 of end plate 3, discs 4, pulley 6 and clutch housing 7, respectively. Hollow ends 11 of rivets 2 are deformed or headed at 42 (FIG. 9), tightly clamping together end plate 3, discs 4, pulley 6 and housing 7 into a rigid and sturdy combination, which with bearings 5 forms clutch housing and pulley assembly 1.

The diameter of central opening 13 of end plate 3 is smaller than that of openings 16 and 26 of discs 4 and pulley 6, so as to provide a protective cover to the outer exposed surface of bearing seal 36, as shown in FIG. 9. Likewise, the diameter of clutch housing opening 33 is smaller than that of discs 4 and pulley 6, so as to extend along a portion of the inner surface of bearing seal 36 to reduce, if not wholly eliminate, the leakage of grease from beyond seal 36. Heretofore, this grease would be thrown by centrifugal force inside the clutch housing and onto the friction surface of the clutch rotor, inevitably resulting in destruction of the clutch.

Assembly 1 preferably is mounted on a reduced end portion 43 of hub 39 and is clamped against a retaining shoulder 44 by a snap ring 45. A clutch rotor 46 is shown by dot-dash lines mounted on hub 39 for rotation with drive shaft 40. Rotor 46 includes a plurality of clutch shoes 47, which are adapted to couplingly engage the inner surface 48 of clutch housing side wall 32 upon shaft 40 reaching a predetermined speed to rotate pulley 6 and a drive belt (not shown) which is mounted within V-groove 29.

Method of Assembly

In further accordance with the invention, clutch housing and pulley assembly 1 is produced by an improved method, the steps of which are shown primarily in FIGS. 4, 5, 6 and 8. Pulley 6 is sandwiched between a plurality of discs 4 (FIG. 4) which are loosely stacked on a type of support plate 50 and aligned by a plurality of guide pins 51. Pins 51 have a spacing complementary to the spacing of rivet-receiving holes 17 and 27 of discs 4 and pulley 6. The number of discs 4 which are stacked with pulley 6 will vary depending upon the particular application with which the final clutch assembly is to be used. When stacked on plate 50, central openings 16 and 26 also will be properly aligned due to guide pins 51.

Plate 50 may be a part of or a separate member of a press or similar type equipment which is positioned beneath an upper press plate 52. Press plate 52 may have various configurations and is shown generally diagrammatically in FIGS. 4-6. A sizing tool, indicated generally at 54, is removably mounted on press plate 52. Sizing tool 54 is shown diagrammatically as a broach having a plurality of metal cutting teeth 55 and a cylindrical-shaped stem 56. Tool 54 also may be a ripple punch or other type of metal cutting tool which is suitable for final sizing of central openings 16 and 26 of discs 4 and pulley 6. Press plate 52 includes a bore 57 in which tool stem 56 is inserted and retained by an appropriate clamping mechanism (not shown). In accordance with the improved method, bearing 5 is telescopically mounted on tool stem 56 above cutting teeth 55, as shown in FIG. 4.

FIG. 5 shows the next step of the improved method wherein the bearing-loaded, sizing tool assembly, shown in the top portion of FIG. 4, is moved vertically downwardly in the direction of arrows A into engagement with the stacked discs and pulley member. Cutting teeth 55 move through aligned central openings 16 and 26, properly sizing and shaping the opening-defining edges of disc openings 16 and pulley opening 26. These openings, when initially formed during the stamping of discs 4 and pulley 6, will be slightly smaller than the final desired size and will not be accurately dimensioned during their initial formation. This somewhat rough initial forming of central openings 16 and 26 reduces the cost of producing the same, since the amount of control required for forming such openings with critical dimensions is eliminated. Teeth 55 are accurately sized to provide the critical dimensions to the final formed and sized openings in the discs and pulley after passage of the sizing tool therethrough from the position of FIG. 5 to that of FIG. 6, as in a usual hole-sizing broaching operation.

The continued downward movement of press plate 52 from the position of FIG. 5 to that of FIG. 6 finishes the sizing of the aligned central openings 16 and 26 and press fits bearing 5 within the sized openings. Press plate 52 also will force the heretofore loosely stacked discs 4 tightly against each other and against base 25 of pulley 6, generally simultaneously with the press fitting of bearing 5 within the just-sized central openings to form subassembly 38.

The clamping mechanism for sizing tool stem 56 then will be released, enabling tool 54 to be removed from the formed subassembly 38, as shown by dot-dash lines in FIG. 6. Press plate 52 then is retracted upwardly, permitting subassembly 38 to be removed from guide pins 51, with tool 54 being reclamped within press bore 57 after loading another bearing 5 thereon for press fitting in another assembly of loosely stacked pulley and disc members.

Thus, a single press stroke final sizes the aligned central openings of the loosely stacked discs and pulley, generally simultaneously with the press fitting of bearing 5 in the just-sized openings. The press also forces tightly together the loosely stacked discs and pulley when final sizing the central openings for mounting of bearing 5 therein. The particular equipment shown in FIGS. 4, 5 and 6 used in forming subassembly 38 may have various configurations and may be partially or fully automated, or a number of subassemblies 38 may be produced by a single press stroke, without departing from the main features of the method; that is, the final sizing of the central openings of the stacked discs and pulley with the generally simultaneous press fitting of the bearing in the just-sized openings.

Subassembly 38 then is mounted on clutch housing 7 and end plate 3 by rivets 2, as shown in FIG. 8. This procedure also may be performed either manually or automatically or a combination thereof by various types of equipment. Rivets 2 are inserted through holes 14 of end plate 3 and then through holes 17 and 27 of discs 4 and pulley 6, which have been previously aligned by guide pins 51 when stacked on support plate 50. Rivets 2 then are inserted through holes 34 of clutch housing hub wall 31, followed by the deformation or heading of rivet ends 11, to form completed clutch housing and pulley assembly 1.

Second Embodiment

A modified form of the improved clutch housing and pulley assembly, which also can be produced by the improved method described above, is shown in FIGS. 10, 11 and 12, and is indicated generally at 60. Most of the major components of modified assembly 60 are shown in an exploded condition in FIG. 10. Modified assembly 60 includes a plurality of rivets 61 (only one of which is shown in FIG. 10), an end plate 52, a plurality of reinforcing or spacer discs 63, a bearing ring 64, a pulley member 65 and a cup-shaped clutch housing 66.

Figure 12:
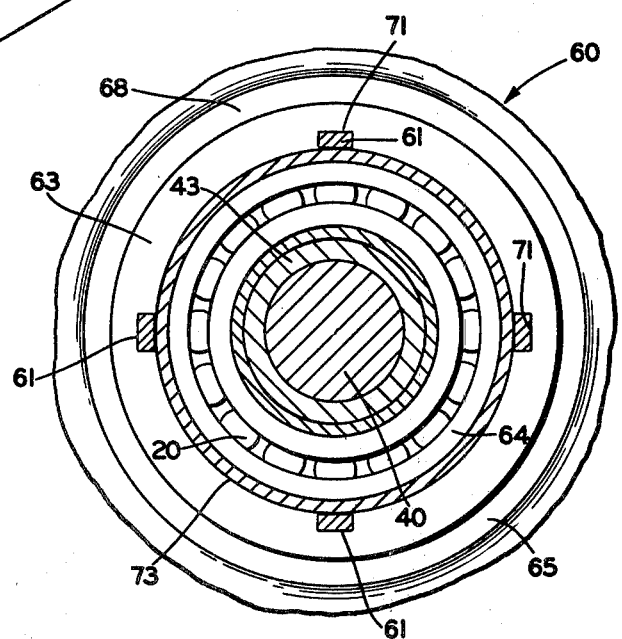
FIG. 12 is a fragmentary sectional view taken on line 12—12, FIG. 11.
Figure 11:
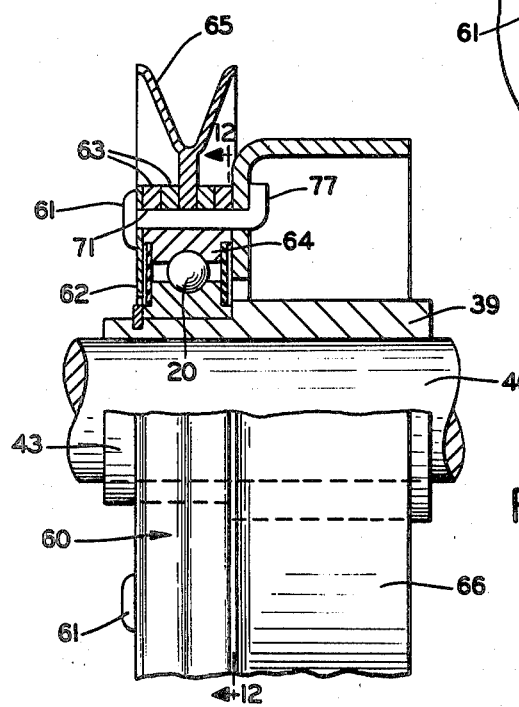
FIG. 11 is an enlarged fragmentary side elevational view, with portions broken away and in section, showing the modified clutch housing and pulley assembly of FIG. 10 mounted on a drive shaft.
Figure 13:
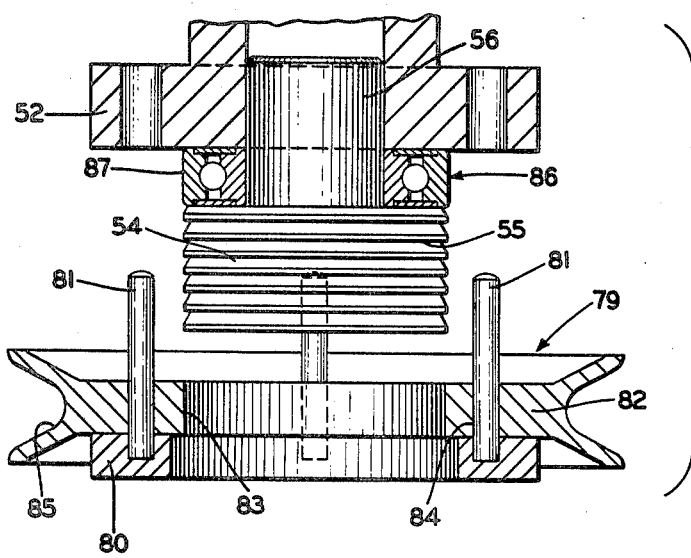
FIG. 13 is a fragmentary diagrammatic, partially exploded view, portions of which are in section, showing a modified form of the improved method of installing a bearing in a pulley member.
Figure 14:
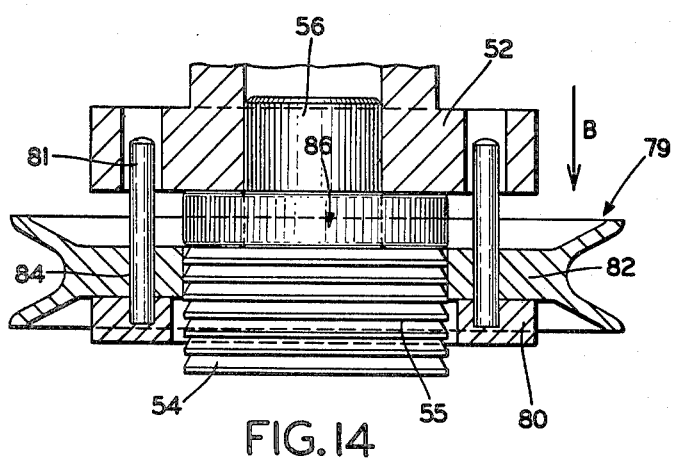
FIG. 14 is a fragmentary diagrammatic view, portions of which are in section, showing the position of the components and sizing tool of FIG. 13 during the sizing step of the improved method.

The components of FIG. 10 are shown in assembled condition in FIGS. 11 and 12 in which four discs 63 are mounted on the radially extending base 68 of pulley 65 instead of the two discs shown in FIG. 10. The components shown in FIG. 10 are similar in nearly all respects to the corresponding components of the first embodiment shown in FIG. 1 except for the configuration of rivets 61 and the location and configuration of the rivet mounting holes formed in end plate 62, discs 63, pulley 65 and clutch housing 66.

Difficulties can be encountered in constructing a clutch housing and pulley assembly having a relatively small diameter pulley with sufficient strength and rigidity to withstand the various forces and stresses which it may encounter during use. Such reduction in pulley size is difficult when using a circular cross-sectional rivet configuration, which rivets extend through complementary-shaped circular holes formed in the various components forming the assembly, since sufficient metal area must be provided completely around the circular openings to provide adequate strength therefor.

The circular openings 14, 17, 27 and 34 of the components of assembly 1 are replaced in modified assembly 60 by rectangular-shaped openings 69 and 70 in end plate 62 and clutch housing 66, and by rectangular-shaped notches 71 and 72 formed in discs 63 and pulley 65, respectively. Notches 71 and 72 are formed in edges 73 and 74, which form central openings 75 and 76, respectively, of discs 63 and pulley 65. Rivets 61 have a rectangular configuration complementary to openings 69-70 and notches 71-72, as shown in FIG. 12.

The use of notches 71 and 72 enables the radial widths of discs 63, base 68 and especially of pulley 65 to be reduced, since additional metal is not required to completely surround the openings as with circular-shaped openings 17 and 27 of assembly 1. This enables the same diameter size shaft receiving openings 75 and 76 to be maintained as with openings 16 and 26 of assembly 1, while reducing the outer diameter of pulley 65 for use in those applications where a smaller diameter pulley is desired, without sacrificing strength and rigidity.

The outer ends 77 of rivets 61 preferably are bent, as shown in FIG. 11, to securely mount end plate 62 and housing 66 on a pulley subassembly similar to subassembly 38, which is formed by the method steps shown in FIGS. 4, 5 and 6, and described above.

Modified Method of Assembly

A modified form of the above-described method and a resulting pulley and clutch assembly is shown in FIGS. 13-16. The method is shown particularly in FIGS. 13-15 with the resulting assembly shown in FIG. 16 and indicated at 78. A pulley 79 is supported and aligned on a support plate 80 which is similar to support plate 50, and is aligned thereon by a plurality of guide pins 81. Pulley 79 has a generally annular configuration with a radially extending central portion or base 82 formed with a central opening 83. A plurality of rivet-receiving holes 84 also are formed in base 82 circumferentially spaced about central opening 83. A peripheral V-groove 85 is formed in the outer edge of pulley 79 by a usual metal splitting operation as described above with respect to pulley 6 or conventional machining and/or casting. The main difference between pulley 79 and pulley 6 is the relatively greater thickness of base 82 than that of pulley base 25.

A bearing ring 86 is mounted on sizing tool stem 56 as is bearing 5 between press plate 52 and hole sizing tool 54. Press plate 52 then is moved downwardly in the direction of arrow B (FIG. 14) with cutting teeth 55 final sizing central opening 83 of pulley 79. The continued downward movement of the press plate and bearing-loaded sizing tool to the position of FIG. 15 completes the final sizing of pulley opening 83 and press fits bearing 86 in the sized opening. The outer race 87 of bearing 86 has a diameter complementary to that of pulley opening 83, and more importantly, has an axial width generally equal to the metal thickness of pulley base portion 82 surrounding opening 83.

Thus, bearing 86 is press fitted and securely mounted within the pulley member without requiring any additional reinforcing or spacing discs 4 as in the above-described embodiments, which were required to provide sufficient surface area for mounting of the bearing within the pulley member central opening in addition to providing a means of spacing the clutch housing from the pulley member.

Figure 15:
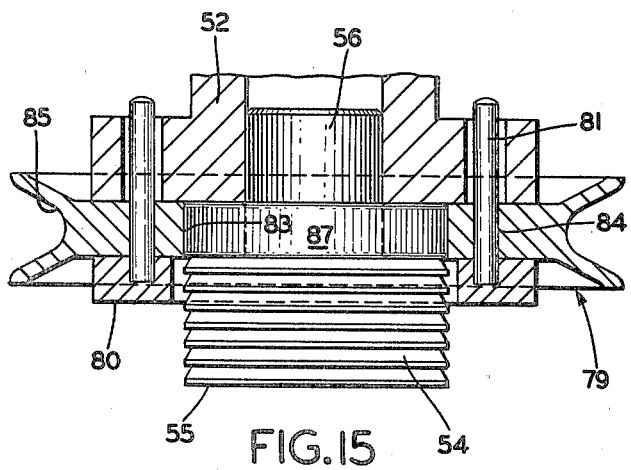
FIG. 15 is a fragmentary diagrammatic view, portions of which are in section, showing the position of the components and sizing tool of FIGS. 13 and 14 during the step of press fitting the bearing in the final sized opening formed in the step of FIG. 14.
Figure 16:
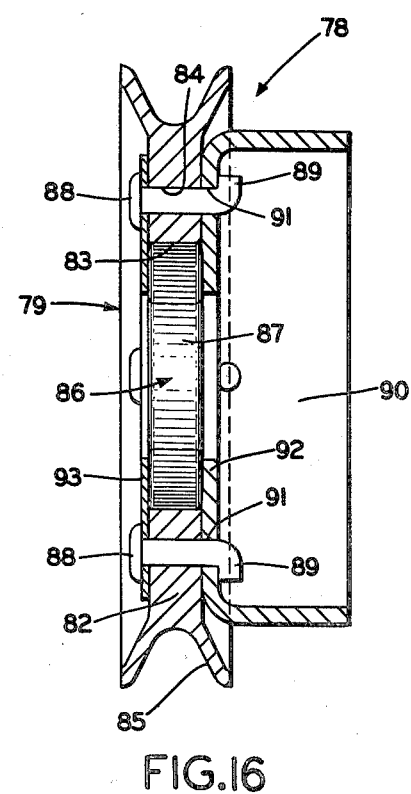
FIG. 16 is a side elevational view with portions in section, showing the clutch housing and pulley assembly formed by the method steps of FIGS. 13-15.

Sizing tool 54 then is unclamped from press plate 52 and removed downwardly from the bearing-pulley subassembly shown in FIG. 15. FIG. 16 shows the bearing-pulley subassembly formed by the method steps of FIGS. 13-15 mounted on a cup-shaped clutch housing 90 by a plurality of rivets 88 which forms assembly 78. Rivets 88 extend through holes 84 formed in the pulley base through which guide pins 81 previously extended in the same manner as do guide pins 51 in the method shown in FIGS. 4-6. The extended ends 89 of rivets 88 then are bent or deformed to securely mount housing 90 on pulley 79 after the rivets pass through holes 91 formed in clutch housing base 92. Clutch housing base 92 is in direct abutting engagement with pulley base 82 and a portion of bearing 86 instead of being spaced therefrom by a plurality of discs as in the above-described embodiments. An end plate 93, similar to end plate 3, is mounted on the opposite side of pulley base 82 from clutch housing 90 by rivets 88.

It is easily seen and understood that the above-described method can be used to install a bearing ring generally simultaneously with the final sizing of a central bearing-receiving opening of various types of components other than a pulley as shown and described above. For example, this improved method may be used to install a bearing within a friction disc, fan blade or other member intended for rotation having a generally flat, radially extending central portion surrounding a central opening.

SUMMARY

Improved assemblies 1, 60 and 78, and the method of making the same have a number of advantages not believed present in prior assemblies and manufacturing methods. The particular assemblies and methods enable various modifications to be made without appreciably affecting the basic construction and method. For example, various numbers of discs 4 and 63 may be mounted on the pulley to strengthen a particular pulley and clutch housing assembly to meet various design and operating characteristics. Only the length of rivets 2 and 61 need be changed to compensate for fewer or additional discs. Clutch housings 7, 66 and 90 can be replaced with housings having various diameters and configurations, as long as a radially extending hub portion or sufficient area surrounding a central bearing-receiving opening is provided for abutment against and attachment to the stacked discs or directly against the pulley base by the mounting rivets. Likewise, a plurality of various pulley configurations and constructions may replace illustrated pulleys 6, 65 and 79 without affecting the particular method of assembly as long as the central openings of the pulleys enable the mounting of bearings 5, 64 and 86 therein, in addition to a surrounding radially extending base portion for engagement with the spacer discs.

It is also seen and readily understood that a multi-V-groove pulley formed either as an integral structural of a combination of one or more single V-grooved pulleys, such as pulleys 6, 65 and 79 may be mounted adjacent to one another on a plurality of adjacent bearing rings, all of which are clamped together and mounted on a clutch housing by rivets. Other types of fastening means than rivets also could be used, if desired. The spacer discs, pulley and clutch housing may be welded or brazed together, although the use of rivets or other type of fastening pin means is believed to be more desirable and efficient.

The particular arrangement set forth above enables the various assembly components to be manufactured completely independently of each other and used for other purposes, enables a broad range of clutches to be constructed to meet various and changing applications, all of which are relatively simple and sturdy and durable in use, and enables an assembly to be produced which is believed to overcome the difficulties encountered with prior art clutch housing and pulley assemblies.

In the foregoing description, certain terms have been used for brevity, clearness and understanding, but no unnecessary limitations, are to be implied therefrom beyond the requirements of the prior art, because such terms are used for descriptive purposes and are intended to be broadly construed.

Moreover, the description and illustration of the invention is by way of example, and the scope of the invention is not limited to the exact details of the construction shown or described.

Having now described the features, discoveries and principles of the invention, the manner in which the improved clutch housing and pulley assembly is constructed, assembled and operated, the characteristics of the new construction, and the advantageous, new and useful results obtained; the new and useful structures, devices, elements, arrangements, parts and combinations are set forth in the appended claims.

I claim:
1. Clutch housing and pulley assembly including:
 (a) a pulley member having a radially extending base terminating in peripheral groove means;
 (b) a central opening formed in the base of the pulley member;
 (c) bearing means mounted in the base opening and adapted to receive a drive shaft therein;
 (d) a plurality of discs, each being formed with a central opening, said discs being mounted concentrically on the pulley member base with the disc openings being axially aligned with the pulley member base opening;
 (e) clutch housing means having a radially extending base and an axially extending cylindrical-shaped side wall;
 (f) pin means mounting the discs and the clutch housing means on the pulley member base with the clutch housing means base being in abutting relationship with at least one of the discs to space the clutch housing means from the pulley member;
 (g) central opening means formed in the clutch housing means base and axially aligned with the disc openings and the pulley member base opening for receiving a drive shaft therethrough;
 (h) a plurality of noncircular notches formed in the pulley member base and discs adjacent and communicating with the central openings in said base and discs, respectively; and
 (i) the pin means having a cross-sectional configuration complementary to the shape of said notches and extending through said notches to mount the discs on the pulley member.

* * * * *